(No Model.)
S. SCHLANGEN.
BUNG.
No. 595,737. Patented Dec. 21, 1897.
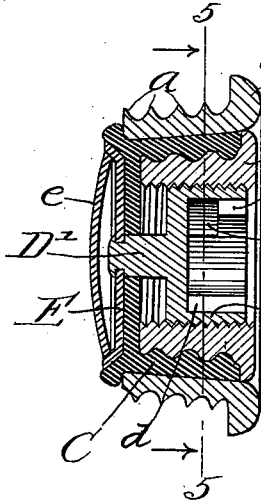
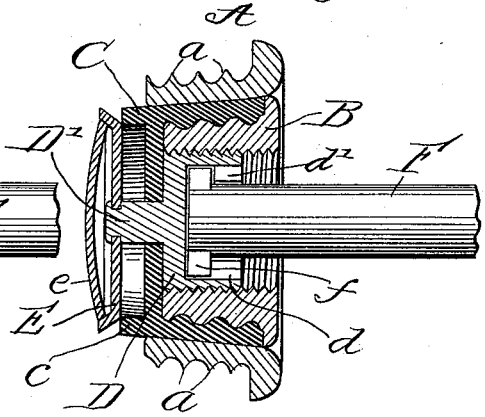
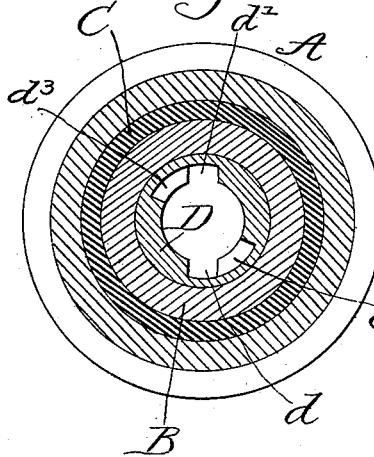
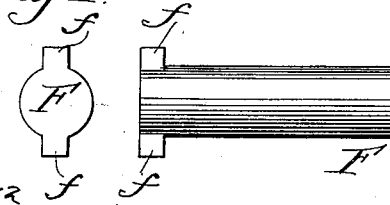
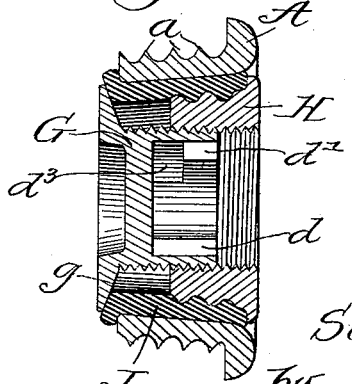
Witnesses.
Wm. M. Rheem.
Wm. F. Henning.
Inventor.
Simon Schlangen
by Samuel E. Hibben
Atty

UNITED STATES PATENT OFFICE.

SIMON SCHLANGEN, OF CHICAGO, ILLINOIS.

BUNG.

SPECIFICATION forming part of Letters Patent No. 595,737, dated December 21, 1897.

Application filed November 11, 1895. Serial No. 568,528. (No model.)

*To all whom it may concern:*

Be it known that I, SIMON SCHLANGEN, residing at Chicago, Cook county, Illinois, have invented certain new and useful Improvements in Bungs, of which the following is a specification.

My invention has relation to bungs for barrels, casks, kegs, and the like; and its object is to provide a comparatively inexpensive but efficient bung device which shall be absolutely gas-tight and capable of being readily removed whenever desired; and my invention consists in the features and details of construction hereinafter described and claimed.

In the accompanying drawings, Figure 1 is a sectional view of my bung open and in a position ready to be withdrawn by the wrench; Fig. 2, a sectional view of the bung closed and the wrench removed; Fig. 3, a view in elevation of the wrench; Fig. 4, a plan view of the end thereof; Fig. 5, a sectional view on line 5 of Fig. 2, looking in the direction of the arrow; and Fig. 6, a sectional view of a modified form of construction of bung.

The bushing A, preferably of metal, is the ordinary one now in general use and, as usual, is provided with external screw-threads $a$, whereby it is firmly secured in the opening of a barrel, keg, or the like. The bung proper consists of a sleeve B, surrounded by a ring C of rubber or other flexible material suitable for the purpose desired. The exterior of the sleeve is provided with heavy threads or corrugations in order to firmly hold the rubber ring thereon. This ring is preferably cup-shaped and is provided with a depending portion $c$ and also with a central aperture.

The bung body or plug consists of a hollow cylindrical piece D, having external screw-threads adapted to be received by internal screw-threads in the sleeve. The plug is provided with an inwardly-extending stem D', passing through the opening in the rubber ring, which here serves as a stuffing device to prevent leakage of gas around the stem. Upon the end of the stem a circular disk E is swiveled and is preferably provided with a cap or plate $e$, which is soldered thereto or otherwise attached so as to be gas-tight in order to prevent any possibility of gas escaping from the barrel or keg.

The plug is provided with two oppositely-disposed slots $d$ $d'$, communicating at the bottom with two slots or ways $d^2$ $d^3$, which are also oppositely arranged, as illustrated in Fig. 5, and at right angles to the slots $d$ $d'$. The key-wrench F is provided at its ends with two lugs or ears $f$, which when the wrench is inserted in the bung body or plug pass down the slots $d$ $d'$ and enter the ways or recesses $d^2$ $d^3$ when partially turned. The purpose and function of this wrench are to rotate the plug and also provide means for withdrawing the entire bung from the bushing when the parts are in such a position to permit this to be done.

My bung being constructed as hereinbefore set forth operates and is used as follows: When the bung is inserted in the bushing, the parts are in their normal position, as shown in Fig. 1, and they are free to enter the same. When the bung is in place, the wrench is turned in the proper direction to rotate the plug D and cause it to rise with respect to the sleeve and carry the disk outward. This action compresses all portions of the rubber ring and forces it tightly against the sides of the bushing, thus making an absolutely gas-tight fit therewith. It also forces the depending portion $c$ of the ring outward against the inner end of the bushing, so that there is no danger of a bung being blown out. The rubber around the stem D' is likewise seated thereon, and an efficient stuffing-box thereby provided to prevent leakage of gas around such stem.

When it is desired to remove the bung, the wrench is inserted and the plug rotated and screwed inward into the sleeve, when the parts will assume the position shown in Fig. 1. The whole bung is then free to be drawn out by means of the wrench whose lugs at this time are in the recesses $d^2$ $d^3$.

I prefer to swivel the disk upon the stem of the plug, so that when the plug is rotated the disk will not turn with it to cause a grinding and wearing action on the rubber ring, but will be pulled up straight without rotation.

In Fig. 6 of the drawings I have illustrated a modified form of construction in which a plug G, having external screw-threads, is adapted to screw into a sleeve H. A rubber ring J is secured to the sleeve by means of corrugations thereon and presses against the bushing. Means similar to those in the other form of construction are provided for screwing the plug in and out.

The inner end of the plug is provided with a sloping circular flange $g$, which engages the inner end of the rubber ring when the plug is screwed outward and not only compresses the rubber and forces it to seat tightly against the bushing, but also throws a portion of the ring out against the bottom edge of the bushing and thereby locks the bung device securely in the barrel or keg against all danger of being blown out by the contained pressure.

By the use of my invention a bung is obtained which is simple in construction and convenient in manipulation, besides being absolutely gas-tight. It is easy of insertion in the bung-hole or bushing and is provided with ready means for its withdrawal whenever desired. Furthermore, my bung may be made to fit all kinds and sizes of bushings now in use on barrels and kegs, &c., without the making of alterations other than in form or size.

Although I have described more or less precise forms and details of construction, I do not intend to be understood as limiting myself thereto, as I contemplate changes in form, the proportion of parts, and the substitution of equivalents as circumstances may suggest or render expedient and without departing from the spirit of my invention.

While it may be preferable to employ a bushing in connection with my bung, it is obvious that the same may be dispensed with and that the bung itself will operate equally well in a simple bung-hole or opening in a barrel and the like.

I claim—

1. In a bung for a barrel and the like, the combination of a bung-body formed in two parts or sections, the outer section being a substantially hollow cylinder or sleeve having internal screw-threads and the inner section being a cup-shaped plug having external screw-threads engaging the threads of the outer section and also having oppositely-disposed slots $d\,d'$ communicating with oppositely-arranged keyways $d^2\,d^3$ substantially at the bottom of the cup-shaped plug for receiving a key-wrench for the purpose of screwing one section upon the other, a ring of flexible material interposed between the outer section of the sides of the bung-hole, and a disk swiveled upon the inner section to force the ring against the sides of the bung-hole when the sections are rotated or screwed together but not adapted to rotate in such operation.

2. A bung, comprising a sleeve having internal screw-threads, a ring of flexible material interposed between the sleeve and the sides of the bung-hole when the bung is in place, a bung-body adapted to be received by the threads of the sleeve and provided with a stem and a disk swiveled on the stem.

3. In combination with a bung-bushing, a sleeve having internal screw-threads, a cup-shaped piece of flexible material receiving the sleeve and provided with a central aperture, a plug screwing into the sleeve and provided with a central stem passing through said aperture and a disk swiveled upon the stem.

4. The combination of a bung-bushing A, a sleeve B having internal screw-threads and external corrugations, a ring C of flexible material engaged by the corrugations of the sleeve, a bung body or plug D adapted to be received by the threads of the sleeve and provided with a stem D', a disk E swiveled upon the stem and a plate or cap $e$ tightly secured to the disk.

5. The combination of a bung-bushing A, a sleeve B, a bung body or plug D screwing into the sleeve and provided with a stem D', a rubber ring C surrounding the sleeve and interposed between it and the bushing, and a plate or disk E swiveled upon the stem D', said plug having slots to receive a key-wrench whereby it may be rotated and the bung locked in the bushing or withdrawn as desired.

SIMON SCHLANGEN.

Witnesses:
SAMUEL E. HIBBEN,
E. NEMETT.